(12) United States Patent
Baghel et al.

(10) Patent No.: US 11,888,628 B2
(45) Date of Patent: Jan. 30, 2024

(54) CONFIGURABLE TRANSMISSION TIMELINE FOR PHYSICAL SIDELINK FEEDBACK CHANNEL

(71) Applicant: QUALCOMM Incorporated, San Diego, CA (US)

(72) Inventors: Sudhir Kumar Baghel, Hillsborough, NJ (US); Gabi Sarkis, San Diego, CA (US); Kapil Gulati, Montgomery, NJ (US); Tien Viet Nguyen, Bridgewater, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/948,273

(22) Filed: Sep. 10, 2020

(65) Prior Publication Data
US 2021/0099261 A1   Apr. 1, 2021

Related U.S. Application Data

(60) Provisional application No. 62/906,285, filed on Sep. 26, 2019.

(51) Int. Cl.
*H04L 1/1867* (2023.01)
*H04W 72/0446* (2023.01)
(Continued)

(52) U.S. Cl.
CPC .......... *H04L 1/1874* (2013.01); *H04L 1/1893* (2013.01); *H04W 72/0446* (2013.01); *H04W 72/30* (2023.01); *H04W 72/51* (2023.01)

(58) Field of Classification Search
CPC ................. H04L 1/1874; H04L 1/1893; H04L 2001/0093; H04L 1/1854; H04W 72/005; H04W 72/0446; H04W 72/048
See application file for complete search history.

(56) References Cited

U.S. PATENT DOCUMENTS

11,382,107  B2 * 7/2022 Jung .................. H04W 4/70
2020/0008229 A1 * 1/2020 Li ..................... H04L 1/0027
(Continued)

OTHER PUBLICATIONS

Intel Corporation: "NR V2X Sidelink Physical Layer Procedures", 3GPP Draft, R1-1908638, Intel—EV2X SL L1 Procedure, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765246, 16 pages, Retrieved from the Internet: URL: http://www.3gpp.org/ftp/tsg_ran/WG1_RL1/TSGR1_98/Docs/R1-1908638.zip. [retrieved on Aug. 17, 20197] p. 1. section 2.1 p. 7. section 2.2.4.

(Continued)

*Primary Examiner* — Nishant Divecha
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a second user equipment, an indication of a time buffer threshold associated with providing sidelink hybrid automatic repeat request feedback on a physical sidelink feedback channel. The UE may receive, from the second user equipment, an indication of an agreement to use the time buffer threshold. The UE may transmit, to the second user equipment and based at least in part on the indication of the agreement, sidelink hybrid automatic repeat request feedback for a sidelink communication received from the second user equipment, the sidelink hybrid automatic repeat request feedback being transmitted on the physical sidelink feedback channel based at least in part on the time buffer threshold. Numerous other aspects are provided.

25 Claims, 11 Drawing Sheets

(51) Int. Cl.
*H04W 72/51* (2023.01)
*H04W 72/30* (2023.01)

(56) References Cited

U.S. PATENT DOCUMENTS

| | | | |
|---|---|---|---|
| 2020/0228247 A1* | 7/2020 | Guo | H04W 52/383 |
| 2020/0228257 A1* | 7/2020 | Baldemair | H04L 5/0092 |
| 2021/0050950 A1* | 2/2021 | Zhou | H04L 1/1861 |
| 2021/0127364 A1* | 4/2021 | Panteleev | H04W 72/0446 |
| 2021/0219320 A1* | 7/2021 | Belleschi | H04W 76/14 |
| 2021/0376962 A1* | 12/2021 | Thomas | H04L 1/1845 |
| 2022/0070847 A1* | 3/2022 | Yoshioka | H04W 72/0406 |
| 2022/0085920 A1* | 3/2022 | Baldemair | H04L 1/1854 |
| 2022/0085923 A1* | 3/2022 | Ye | H04W 72/02 |

OTHER PUBLICATIONS

International Search Report and Written Opinion—PCT/US2020/070534—ISA/EPO—dated Dec. 1, 2020.

* cited by examiner

CONFIGURABLE TRANSMISSION TIMELINE FOR PHYSICAL SIDELINK FEEDBACK CHANNEL

CROSS-REFERENCE TO RELATED APPLICATION

This patent application claims priority to U.S. Provisional Patent Application No. 62/906,285, filed on Sep. 26, 2019, entitled "CONFIGURABLE TRANSMISSION TIMELINE FOR PHYSICAL SIDELINK FEEDBACK CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a configurable transmission timeline for a physical sidelink feedback control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment, may include transmitting, to a second user equipment, an indication of a time buffer threshold associated with providing sidelink hybrid automatic repeat request feedback on a physical sidelink feedback channel; receiving, from the second user equipment, an indication of an agreement to use the time buffer threshold; and transmitting, to the second user equipment and based at least in part on the indication of the agreement, sidelink hybrid automatic repeat request feedback for a sidelink communication received from the second user equipment, the sidelink hybrid automatic repeat request feedback being transmitted on the physical sidelink feedback channel based at least in part on the time buffer threshold.

In some aspects, a method of wireless communication, performed by a first user equipment, may include receiving, from a second user equipment, an indication of a time buffer threshold associated with providing sidelink hybrid automatic repeat request feedback on a physical sidelink feedback channel; transmitting, to the second user equipment, an indication of an agreement to use the time buffer threshold; and receiving, from the second user equipment and based at least in part on the indication of the agreement, sidelink hybrid automatic repeat request feedback for a sidelink communication transmitted to the second user equipment, the sidelink hybrid automatic repeat request feedback being received on the physical sidelink feedback channel based at least in part on the time buffer threshold.

In some aspects, a method of wireless communication, performed by a first user equipment, may include identifying a time buffer threshold, from a plurality of candidate time buffer thresholds, associated with providing sidelink hybrid automatic repeat request feedback on a physical sidelink feedback channel; and transmitting an indication of the time buffer threshold to one or more other user equipment, the indication of the time buffer threshold being included in sidelink control information.

In some aspects, a first user equipment for wireless communication may include memory and one or more processors coupled to the memory. The memory and the one or more processors may be configured to transmit, to a second user equipment, an indication of a time buffer threshold associated with providing sidelink hybrid automatic repeat request feedback on a physical sidelink feedback channel; receive, from the second user equipment, an indication of an agreement to use the time buffer threshold; and transmit, to the second user equipment and based at least in part on the indication of the agreement, sidelink hybrid automatic repeat request feedback for a sidelink communication received from the second user equipment, the sidelink hybrid automatic repeat request feedback being transmitted on the physical sidelink feedback channel based at least in part on the time buffer threshold.

In some aspects, a first user equipment for wireless communication may include memory and one or more processors coupled to the memory. The memory and the one or more processors may be configured to receive, from a second user equipment, an indication of a time buffer threshold associated with providing sidelink hybrid automatic repeat request feedback on a physical sidelink feedback channel; transmit, to the second user equipment, an indication of an agreement to use the time buffer threshold; and receive, from the second user equipment and based at least in part on the indication of the agreement, sidelink hybrid automatic repeat request feedback for a sidelink communication transmitted to the second user equipment, the sidelink hybrid automatic repeat request feedback being received on the physical sidelink feedback channel based at least in part on the time buffer threshold.

In some aspects, a first user equipment for wireless communication may include memory and one or more processors coupled to the memory. The memory and the one or more processors may be configured to identify a time buffer threshold, from a plurality of candidate time buffer thresholds, associated with providing sidelink hybrid automatic repeat request feedback on a physical sidelink feedback channel; and transmit an indication of the time buffer threshold to one or more other user equipment, the indication of the time buffer threshold being included in sidelink control information.

In some aspects, a non-transitory computer-readable medium may store one or more instructions for wireless communication. The one or more instructions, when executed by one or more processors of a first user equipment, may cause the one or more processors to transmit, to a second user equipment, an indication of a time buffer threshold associated with providing sidelink hybrid automatic repeat request feedback on a physical sidelink feedback channel; receive, from the second user equipment, an indication of an agreement to use the time buffer threshold; and transmit, to the second user equipment and based at least in part on the indication of the agreement, sidelink hybrid automatic repeat request feedback for a sidelink communication received from the second user equipment, the sidelink hybrid automatic repeat request feedback being transmitted on the physical sidelink feedback channel based at least in part on the time buffer threshold.

In some aspects, a non-transitory computer-readable medium may store one or more instructions for wireless communication. The one or more instructions, when executed by one or more processors of a first user equipment, may cause the one or more processors to receive, from a second user equipment, an indication of a time buffer threshold associated with providing sidelink hybrid automatic repeat request feedback on a physical sidelink feedback channel; transmit, to the second user equipment, an indication of an agreement to use the time buffer threshold; and receive, from the second user equipment and based at least in part on the indication of the agreement, sidelink hybrid automatic repeat request feedback for a sidelink communication transmitted to the second user equipment, the sidelink hybrid automatic repeat request feedback being received on the physical sidelink feedback channel based at least in part on the time buffer threshold.

In some aspects, a non-transitory computer-readable medium may store one or more instructions for wireless communication. The one or more instructions, when executed by one or more processors of a first user equipment, may cause the one or more processors to identify a time buffer threshold, from a plurality of candidate time buffer thresholds, associated with providing sidelink hybrid automatic repeat request feedback on a physical sidelink feedback channel; and transmit an indication of the time buffer threshold to one or more other user equipment, the indication of the time buffer threshold being included in sidelink control information.

In some aspects, a first apparatus for wireless communication may include means for transmitting, to a second apparatus, an indication of a time buffer threshold associated with providing sidelink hybrid automatic repeat request feedback on a physical sidelink feedback channel; means for receiving, from the second apparatus, an indication of an agreement to use the time buffer threshold; and means for transmitting, to the second apparatus and based at least in part on the indication of the agreement, sidelink hybrid automatic repeat request feedback for a sidelink communication received from the second apparatus, the sidelink hybrid automatic repeat request feedback being transmitted on the physical sidelink feedback channel based at least in part on the time buffer threshold.

In some aspects, a first apparatus for wireless communication may include means for receiving, from a second apparatus, an indication of a time buffer threshold associated with providing sidelink hybrid automatic repeat request feedback on a physical sidelink feedback channel; means for transmitting, to the second apparatus, an indication of an agreement to use the time buffer threshold; and means for receiving, from the second apparatus and based at least in part on the indication of the agreement, sidelink hybrid automatic repeat request feedback for a sidelink communication transmitted to the second apparatus, the sidelink hybrid automatic repeat request feedback being received on the physical sidelink feedback channel based at least in part on the time buffer threshold.

In some aspects, a first apparatus for wireless communication may include means for identifying a time buffer threshold, from a plurality of candidate time buffer thresholds, associated with providing sidelink hybrid automatic repeat request feedback on a physical sidelink feedback channel; and means for transmitting an indication of the time buffer threshold to one or more other apparatus, the indication of the time buffer threshold being included in sidelink control information.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
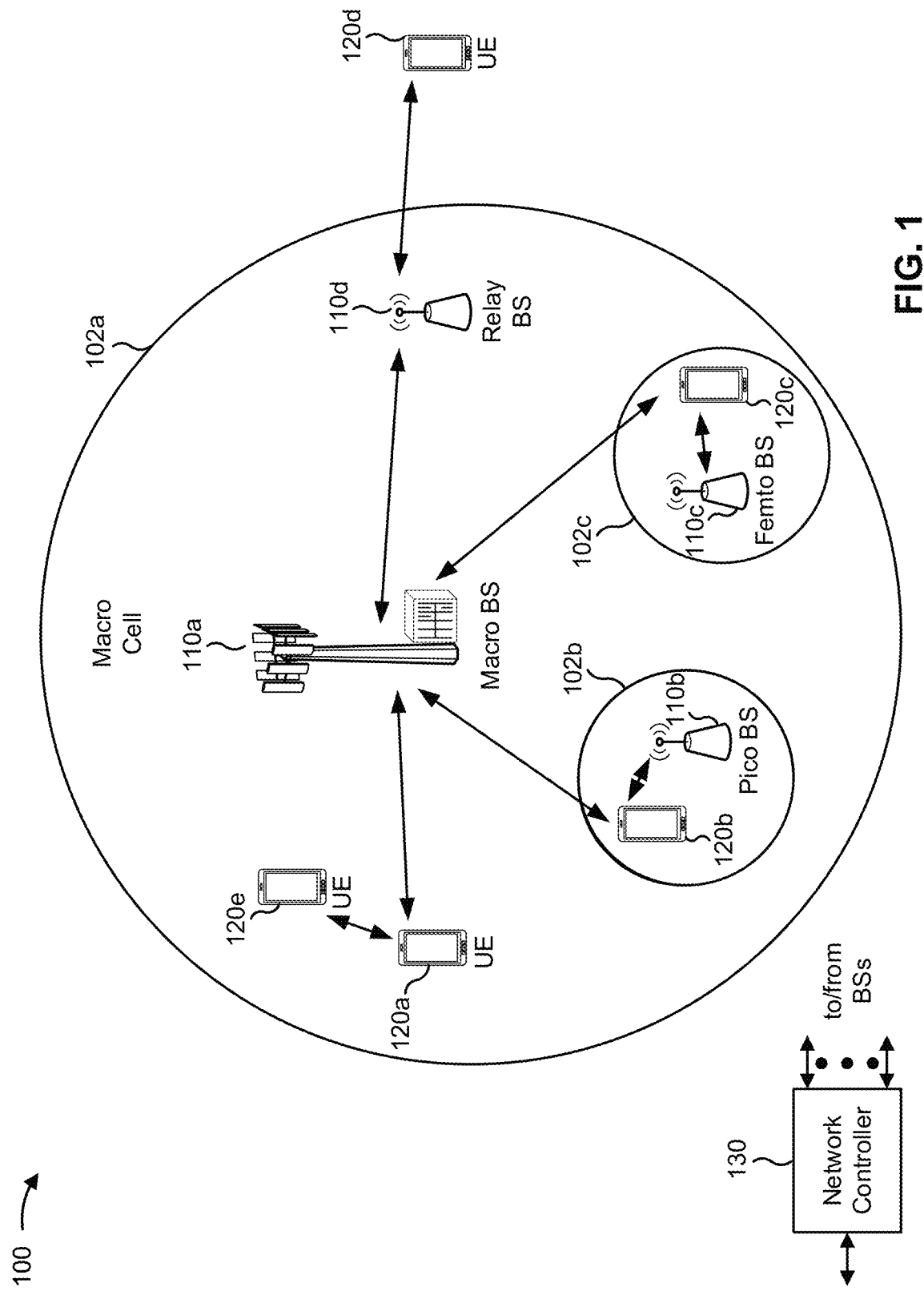
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
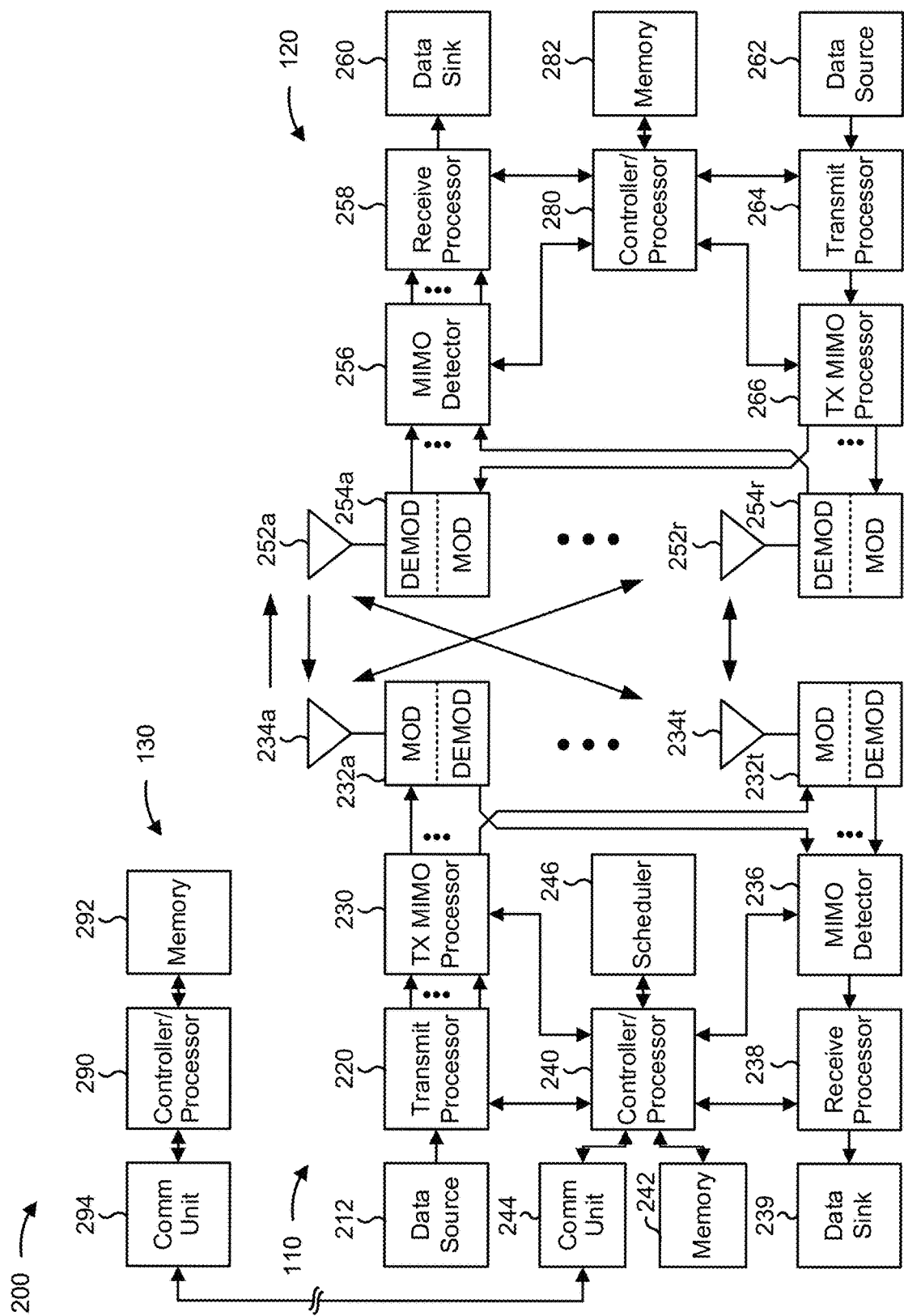
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a configurable transmission timeline for a physical sidelink feedback control channel (PSFCH), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, process 900 of FIG. 9, and/or other processes as described herein. A scheduler 246 may schedule UEs for data transmission on the downlink and/or uplink.

In some aspects, UE 120 may include means for transmitting, to a second UE 120, an indication of a time buffer threshold associated with providing sidelink hybrid automatic repeat request (HARQ) feedback on a PSFCH, means for receiving, from the second UE 120, an indication of an agreement to use the time buffer threshold, means for transmitting, to the second UE 120 and based at least in part on the indication of the agreement, sidelink HARQ feedback for a sidelink communication received from the second UE 120, the sidelink HARQ feedback being transmitted on the PSFCH based at least in part on the time buffer threshold, and/or the like. In some aspects, UE 120 may include means for receiving, from a second UE 120, an indication of a time buffer threshold associated with providing sidelink HARQ feedback on a PSFCH, means for transmitting, to the second UE 120, an indication of an agreement to use the time buffer threshold, means for receiving, from the second UE 120 and based at least in part on the indication of the agreement, sidelink HARQ feedback for a sidelink communication transmitted to the second UE 120, the sidelink HARQ feedback being received on the PSFCH based at least in part on the time buffer threshold, and/or the like. In some aspects, UE 120 may include means for identifying a time buffer threshold, from a plurality of candidate time buffer thresholds, associated with providing sidelink hybrid automatic repeat request feedback on a physical sidelink feedback channel; and transmitting an indication of the time buffer threshold to one or more other user equipments, the indication of the time buffer threshold being included in sidelink control information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
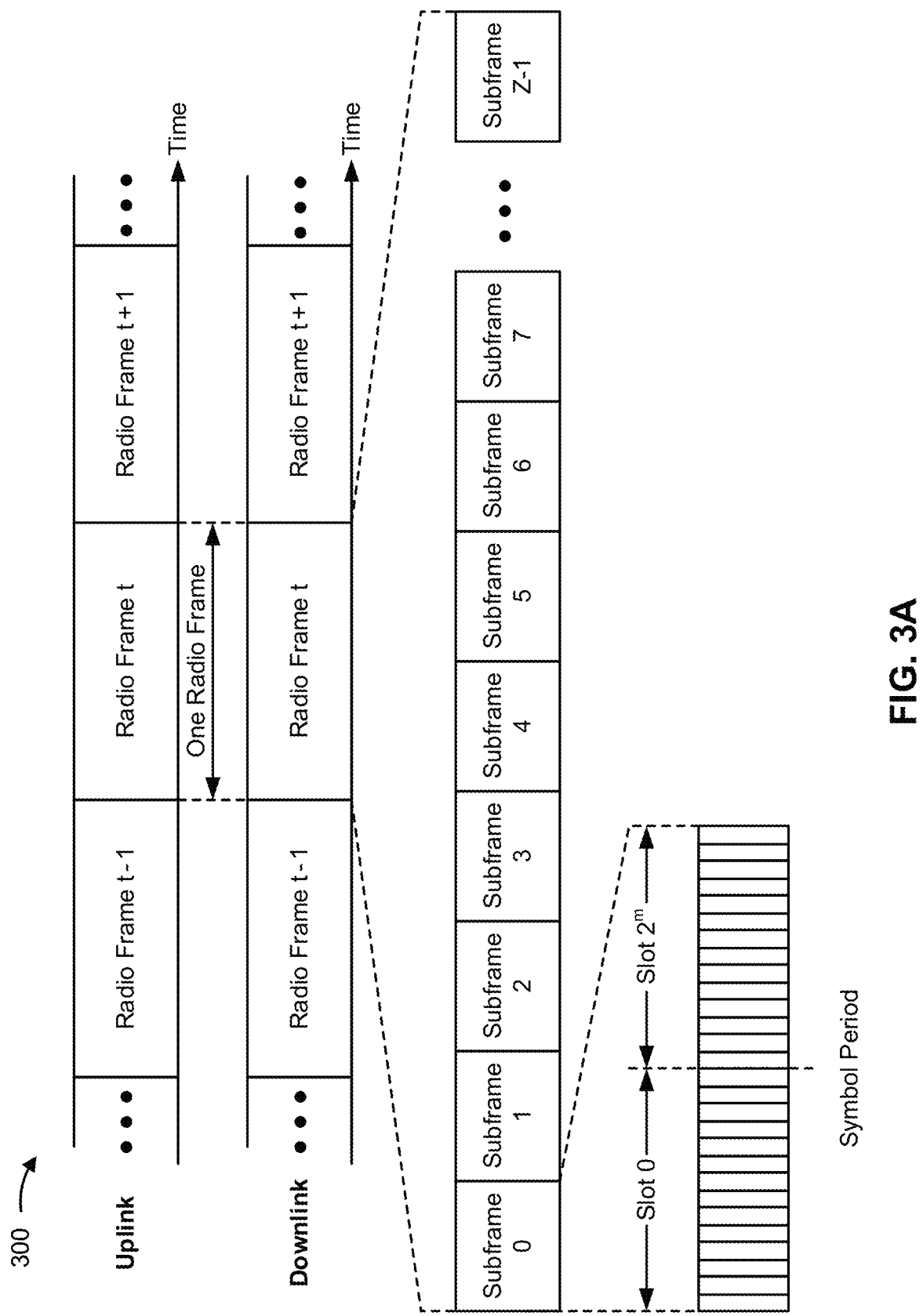
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
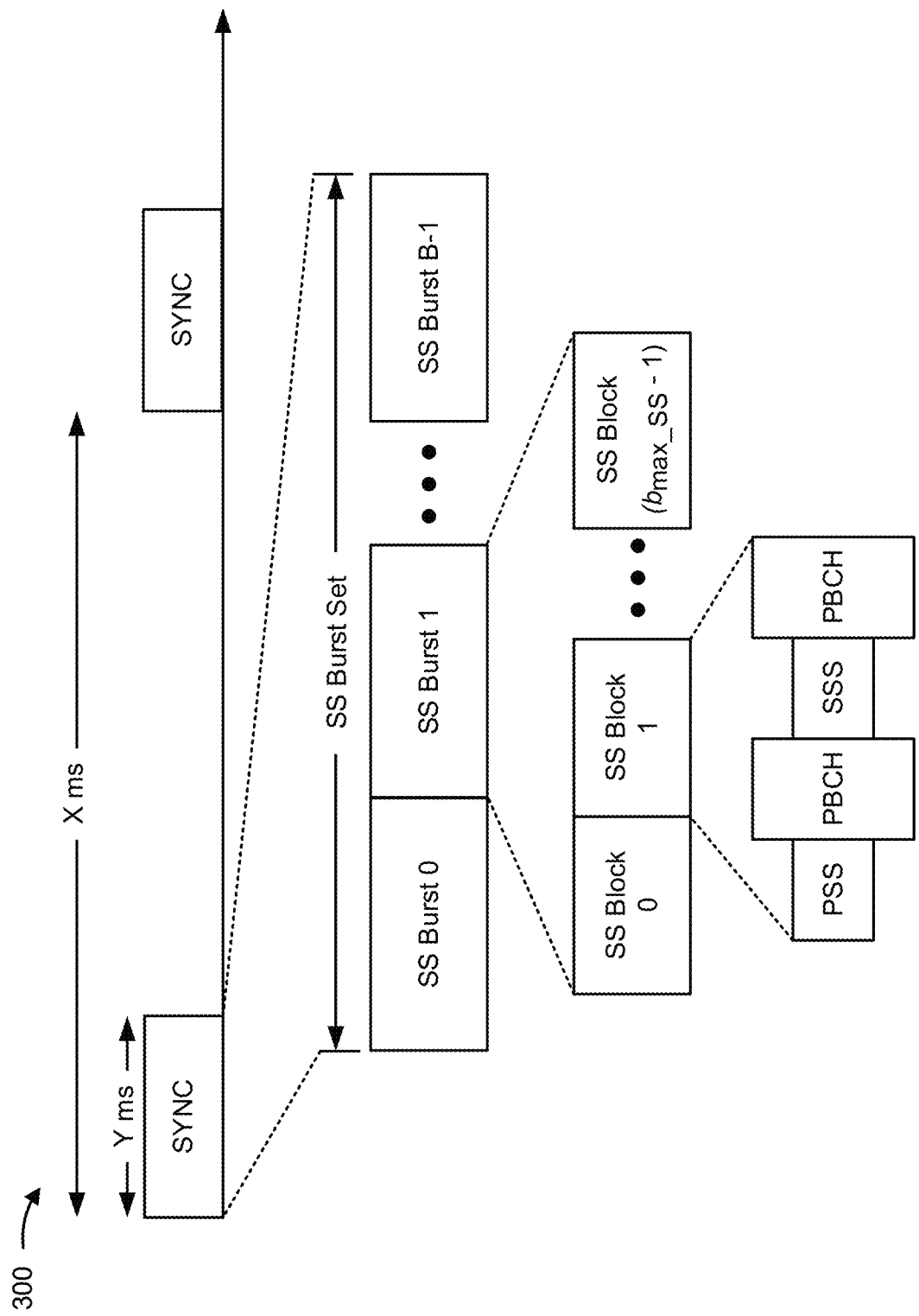
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
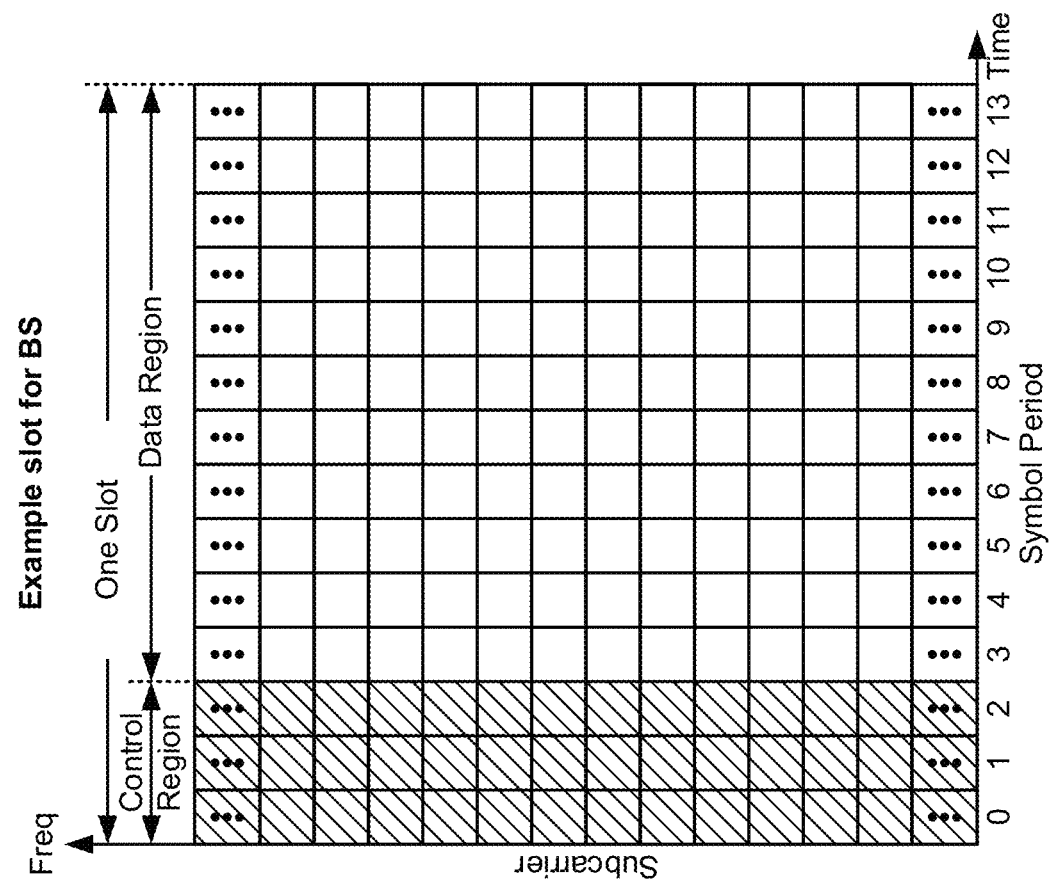
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable to other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a UE may transmit sidelink communications to one or more other UEs, and/or receive sidelink communications from one or more other UEs. For example, a UE may receive a sidelink communication on a sidelink channel between the UE and another UE (e.g., a physical sidelink shared channel (PSSCH), a physical sidelink control channel (PSCCH), and/or the like), may receive a sidelink communication on a sidelink communication between the UE and another UE, and/or the like.

In some cases, a UE may transmit feedback to another UE based at least in part on a sidelink communication transmitted to the UE. The feedback may include, for example, hybrid automatic repeat request (HARQ) feedback, channel state information (CSI) feedback, and/or the like. Sidelink HARQ feedback may include an indication of whether a sidelink communication was successfully received (e.g., an acknowledgement (ACK)) or not successfully received (e.g., a negative acknowledgment (NACK)).

In some cases, a UE may be configured to transmit sidelink HARQ feedback on a PSFCH based at least in part on a transmission timeline for transmitting sidelink HARQ feedback on the PSFCH. The transmission timeline may be based at least in part on a time buffer relative to a time at which a sidelink communication was transmitted or received (e.g., relative to an ending slot and/or symbol of the sidelink communication). The time buffer may be a quantity of slots, a quantity of symbols, and/or the like between the slot and/or symbol in which the UE received the sidelink communication, and the slot and/or symbol in which the UE may transmit sidelink HARQ feedback for the sidelink communication. For example, if reception of a sidelink communication at a UE ends in slot n, the earliest slot in which the UE may transmit sidelink HARQ feedback for the sidelink communication may be identified as n+a, where a is the time buffer between slot n and a subsequent slot that includes sidelink HARQ feedback resources in which the UE may transmit the sidelink HARQ feedback.

A UE may determine a based at least in part on a K value. The K value may be a time buffer threshold that ensures a time gap, between reception of a sidelink communication and transmission of associated sidelink HARQ feedback, so that a UE may generate the sidelink HARQ feedback during the time gap. Accordingly, a UE may identify a slot that includes sidelink HARQ feedback resources, after a slot n, such that the time buffer (e.g., a) between slot n and the slot that includes sidelink HARQ feedback resources satisfies the time buffer threshold (e.g., the K value).

In some cases, the K value may be configured to be the same for all UEs associated with a particular cell, for all UEs included in a particular group of UEs, for all UEs associated with a particular sidelink receive resource pool, for all UEs in the wireless network, and/or the like. However, a K value that is the same for a plurality of UEs may result in some UEs that might not be capable of supporting the K value, may result in inefficient sidelink HARQ feedback reporting for some UEs, and/or the like. For example, a UE might not be capable of supporting a K value if the K value is set to a low quantity of slots and/or symbols, and if the UE is a low-capability UE (e.g., the processing, software, memory, and/or networking configuration of the UE may not be capable of generating and transmitting sidelink HARQ feedback within a quantity of symbols and/or slots configured for a K value). As another example, a UE might be capable of generating and transmitting sidelink HARQ feedback at faster time intervals than a configured K value if the K value is set to a low quantity of slots and/or symbols if the UE is a high-capability UE.

Some aspects described herein provide techniques and apparatuses for a configurable transmission timeline for PSFCH. In some aspects, a UE may identify and/or select a time buffer threshold (e.g., a K value) from a plurality of candidate time buffer thresholds. In some aspects, the UE may identify and/or select the time buffer threshold based at least in part on a capability of the UE to generate and transmit sidelink HARQ feedback and/or other parameters. In some aspects, if the UE communicates with a plurality of other UEs in a groupcast or multicast configuration, the UE may transmit an indication of the time buffer threshold in sidelink control information (SCI) to the plurality of other UEs. In some aspects, if the UE communicates with another UE in a unicast configuration, the UE may negotiate the time buffer threshold with the other UE by transmitting an indication of the time buffer threshold to the UE, and the other UE may respond with an indication of an agreement to use the time buffer threshold (or may reject the time buffer threshold and propose a different time buffer threshold).

In this way, the UE may transmit sidelink HARQ feedback to one or more other UEs based at least in part on a time buffer threshold specifically configured for the UE. This permits the UE to identify and/or select a time buffer threshold that is compatible with the UE's capability for generating and transmitting sidelink HARQ feedback, permits the UE to identify and/or select a time buffer threshold that increases the efficiency of sidelink HARQ feedback reporting of the UE, and/or the like.

Figure 5A:
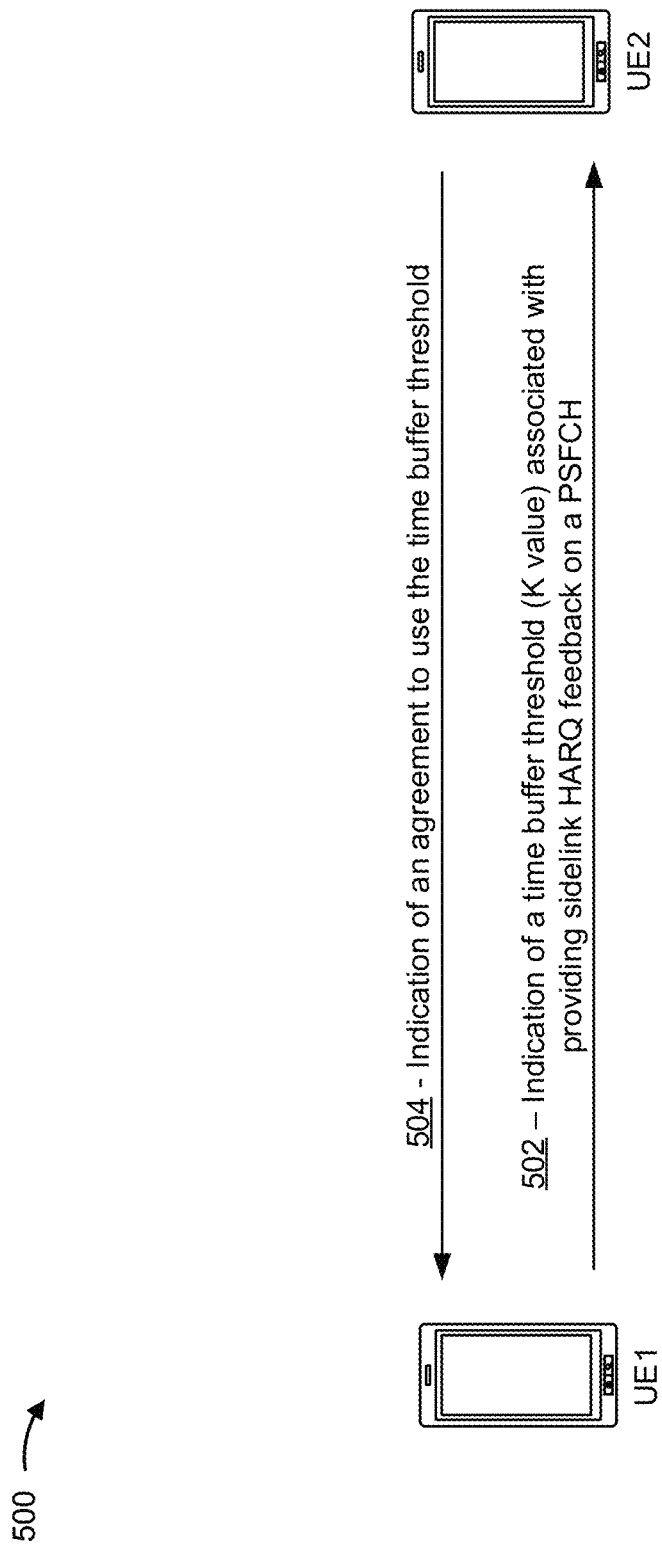
FIGS. 5A, 5B, and 6 are diagrams illustrating examples of a configurable transmission timeline for a physical sidelink feedback control channel, in accordance with various aspects of the present disclosure.
Figure 5B:
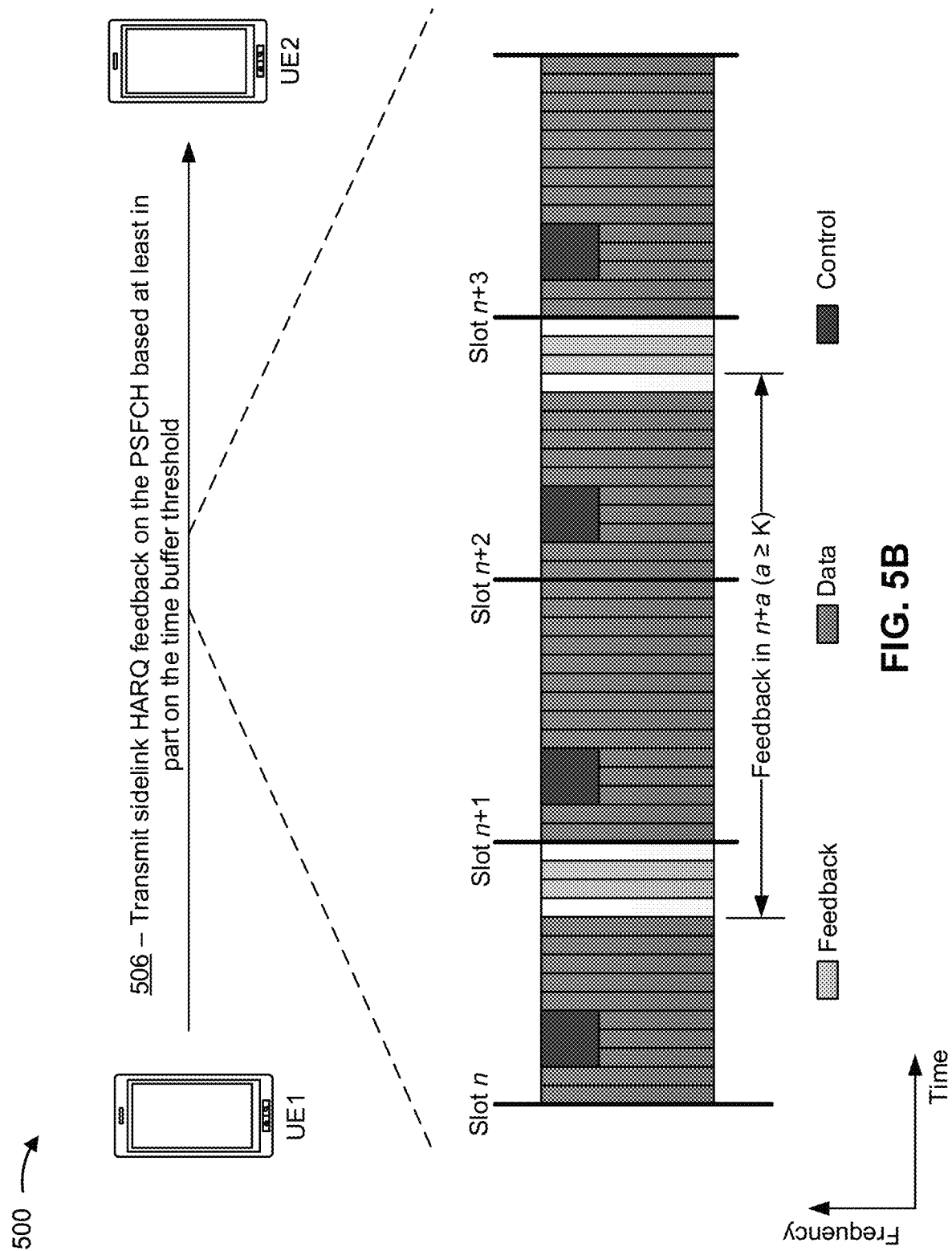

FIGS. 5A and 5B are diagrams illustrating one or more examples 500 of a configurable transmission timeline for PSFCH, in accordance with various aspects of the present disclosure. As shown in FIGS. 5A and 5B, example(s) 500 may include communication between a plurality of UEs (e.g., UEs 120), such as UE1, UE2, and/or the like. In some aspects, UE1 and UE2 may be included in a wireless network (e.g., wireless network 100). In some aspects, UE1 and UE2 may communicate on a sidelink between UE1 and UE2 in a unicast configuration.

In some aspects, UE1 may be configured to generate and transmit sidelink HARQ feedback to UE2. For example, UE1 may be configured to generate and transmit sidelink HARQ feedback based at least in part on a unicast sidelink communication received from UE2 (e.g., on a PSSCH, a PSCCH, and/or other sidelink channels of the sidelink).

As shown in FIG. 5A, and by reference number 502, UE1 may transmit, to UE2, an indication of a time buffer threshold (e.g., a K value) for transmitting sidelink HARQ feedback to UE2 on a PSFCH. In some aspects, UE1 may identify and/or select the time buffer threshold from a plurality of candidate time buffer thresholds that are permitted to be selected by UE1. In some aspects, a BS (e.g., BS 110), UE2, and/or another entity may configure the plurality of candidate time buffer thresholds for UE1.

In some aspects, UE1 may select the time buffer threshold based at least in part on a UE capability of UE1. For example, UE1 may select the time buffer threshold based at least in part on a processing capability of UE1, a memory capability of UE1, a network or communication capability of UE1 (e.g., a throughput associated with UE1, a latency associated with UE1, and/or the like), a capability of UE1 to generate and transmit sidelink HARQ feedback, and/or the like. In some aspects, UE1 may select the time buffer threshold based at least in part on other parameters, such as channel conditions on the sidelink between UE1 and UE2.

In this case, UE1 may select the time buffer threshold based at least in part on a signal quality on the sidelink, a signal strength on the sidelink, and/or the like.

In some aspects, UE1 may transmit the indication of the time buffer threshold to UE2 during connection establishment with UE2. In some aspects, UE1 may transmit the indication of the time buffer threshold to UE2 after connection establishment with UE2. In some aspects, UE1 may periodically or non-periodically update the time buffer threshold (e.g., based at least in part on RSRP, RSRQ, RSSI, CQI, and/or other types of measurement parameters). In some aspects, UE1 may transmit the indication of the time buffer threshold to UE2 in SCI in a PSSCH communication, in SCI in a PSCCH communication, and/or the like.

As further shown in FIG. 5A, and as shown by reference number 504, UE2 may receive the indication of the time buffer threshold, and may transmit an indication of an agreement to use the time buffer threshold. In this way, UE1 and UE2 may negotiate the time buffer threshold between peer UEs. In some aspects, UE2 may reject the time buffer threshold, may transmit an indication of a rejection of the time buffer threshold, and may transmit an indication of another time buffer threshold. In this case, UE1 may agree to the use of the other time buffer threshold, or UE1 and UE2 may continue to negotiate until a time buffer threshold is agreed upon.

As shown in FIG. 5B, and by reference number 506, UE1 may receive a sidelink communication from UE2 (e.g., a unicast sidelink communication) and may transmit sidelink HARQ feedback, associated with the sidelink communication, on the PSFCH based at least in part on the agreed upon time buffer threshold. In some aspects, UE1 may transmit the sidelink HARQ feedback in a sidelink communication on the PSFCH.

As an example, and as illustrated in FIG. 5B, UE1 may receive a sidelink communication from UE2 in slot n. The sidelink communication may include data, control information, and/or other types of information that may be time division multiplexed and/or frequency division multiplexed in slot n. UE1 may identify a subsequent slot that includes sidelink HARQ feedback resources in which UE1 may transmit sidelink HARQ feedback to UE2 based at least in part on the sidelink communication received in slot n. The subsequent slot may occur at a time buffer a (e.g., n+a) from an ending slot n. In this case, UE1 may select the subsequent slot (e.g., slot n+2 in this example) such that the time buffer satisfies the time buffer threshold (e.g., such that a≥K) agreed upon between UE1 and UE2 (e.g., where the K value may be 2 slots in this example).

In some aspects, UE2 may receive the sidelink HARQ feedback from UE1. In some aspects, due to UE1 and other UEs being permitted to configure a particular time buffer threshold, the sidelink HARQ feedback from UE1 may collide (e.g., may at least partially overlap in the time domain and/or frequency domain) with another sidelink HARQ feedback from another UE. In this case, UE1 and the other UE may transmit respective sidelink HARQ feedback using different PSFCH sequences (e.g., UE1 may scramble the sidelink communication carrying the sidelink HARQ feedback of UE1, and the other UE may scramble the sidelink communication carrying the sidelink HARQ feedback of the other UE). UE2 may detect the collision and may identify the sidelink HARQ feedback of UE1 from the sidelink HARQ feedback of the other UE, based at least in part on the respective PSFCH sequences associated with UE1 and the other UE. UE1 may generate a PSFCH sequence based at least in part on a source identifier and/or another type of UE identifier associated with UE1, and the other UE may generate a PSFCH sequence based at least in part on a source identifier and/or another type of UE identifier associated with the other UE.

In this way, UE1 may transmit sidelink HARQ feedback to UE2 based at least in part on a time buffer threshold specifically configured for UE1. This permits UE1 to identify and/or select a time buffer threshold that is compatible with UE1's capability for generating and transmitting sidelink HARQ feedback, permits UE1 to identify and/or select a time buffer threshold that increases the efficiency of sidelink HARQ feedback reporting of UE1, and/or the like.

As indicated above, FIGS. 5A and 5B are provided as one or more examples. Other examples may differ from what is described with respect to FIGS. 5A and 5B. For example, UE2 may configure a particular time buffer threshold for providing sidelink HARQ feedback to UE1 using one or more techniques described above in connection with FIGS. 5A and 5B.

Figure 6:
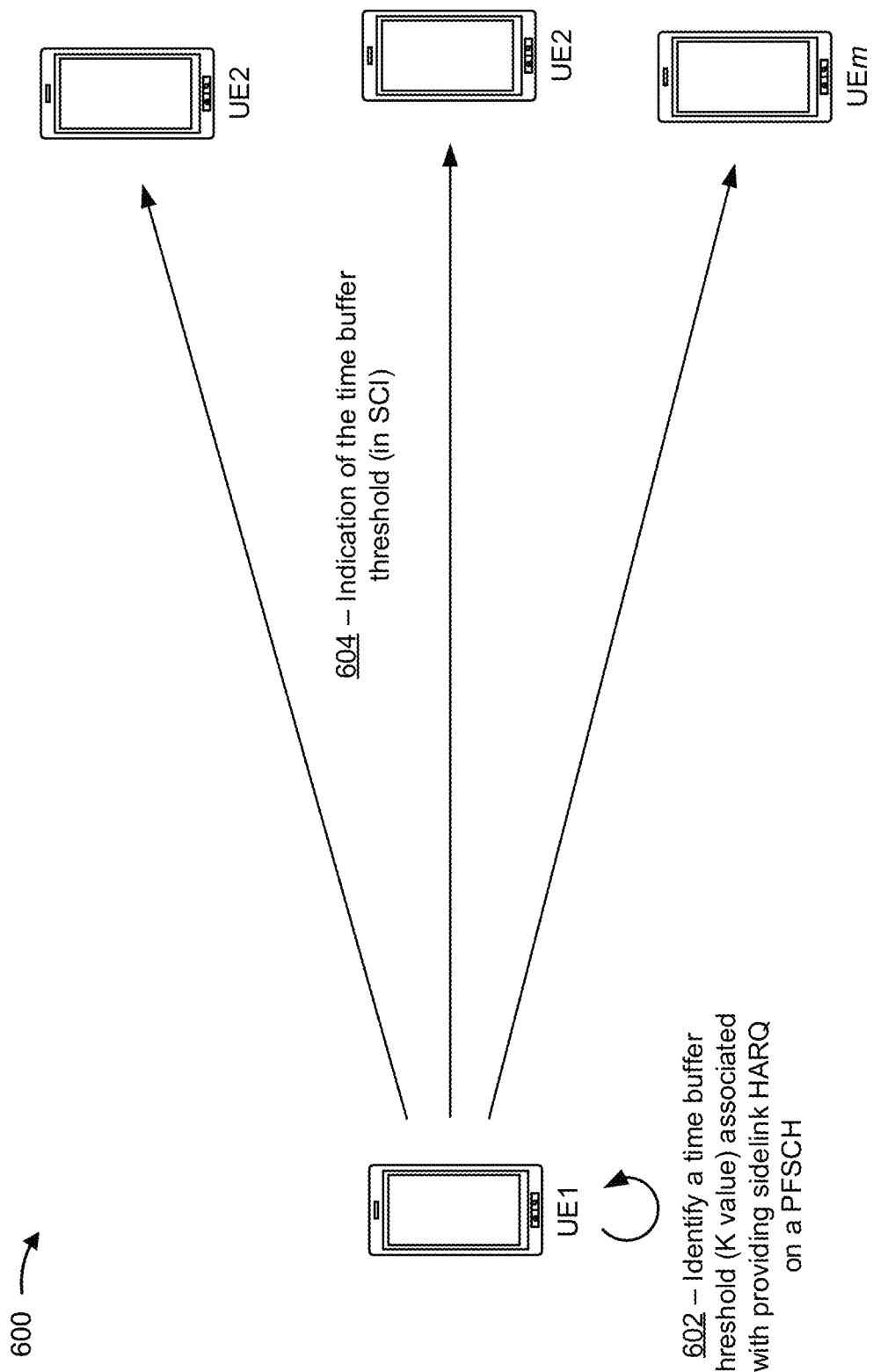

FIG. 6 is a diagram illustrating one or more examples 600 of a configurable transmission timeline for PSFCH, in accordance with various aspects of the present disclosure. As shown in FIG. 6, example(s) 600 may include communication between a plurality of UEs (e.g., UEs 120), such as UE1 through UEm and/or the like. In some aspects, UE1 through UEm may be included in a wireless network (e.g., wireless network 100). In some aspects, UE1 through UEm may communicate on one or more sidelinks between UE1 through UEm in a groupcast or multicast configuration.

In some aspects, UE1 may be configured to generate and transmit sidelink HARQ feedback to one or more of UE2 through UEm. For example, UE1 may be configured to generate and transmit sidelink HARQ feedback based at least in part on a groupcast or multicast sidelink communication received from UE2 (e.g., on a PSSCH, a PSCCH, and/or other sidelink channels of the sidelink) and/or another UE of UE3 through UEm.

As shown in FIG. 6, and by reference number 602, UE1 may identify a time buffer threshold (e.g., a K value) associated with providing sidelink HARQ feedback to UE2 through UEm on a PSFCH. In some aspects, UE1 may identify and/or select the time buffer threshold from a plurality of candidate time buffer thresholds that are permitted to be selected by UE1. In some aspects, a BS (e.g., BS 110), one or more of UE2 through UEm, and/or another entity may configure the plurality of candidate time buffer thresholds for UE1.

In some aspects, UE1 may identify and/or select the time buffer threshold based at least in part on a UE capability of UE1. For example, UE1 may select the time buffer threshold based at least in part on a processing capability of UE1, a memory capability of UE1, a network or communication capability of UE1 (e.g., a throughput associated with UE1, a latency associated with UE1, and/or the like), a capability of UE1 to generate and transmit sidelink HARQ feedback, and/or the like. In some aspects, UE1 may select the time buffer threshold based at least in part on other parameters, such as channel conditions on a sidelink between UE1 and one or more of UE2 through UEm. In this case, UE1 may select the time buffer threshold based at least in part on a signal quality on the sidelink, a signal strength on the sidelink, and/or the like.

As shown in FIG. 6, and by reference number 604, UE1 may transmit, to UE2 through UEm, an indication of the time buffer threshold. In some aspects, UE1 may transmit the indication of the time buffer threshold in a groupcast or multicast sidelink communication to UE2 through UEm. In some aspects, the indication of the time buffer threshold may be included in SCI in the groupcast or multicast sidelink communication.

In some aspects, UE1 may subsequently receive a sidelink communication (e.g., a groupcast or multicast sidelink communication) from a UE of UE2 through UEm (e.g., UE2) and may transmit sidelink HARQ feedback to the UE on the PSFCH based at least in part on the time buffer threshold. In some aspects, UE1 may transmit the sidelink HARQ feedback in a sidelink communication on the PSFCH at a time buffer a after receiving the groupcast or multicast sidelink communication. For example, UE1 may transmit the sidelink HARQ feedback such that the time buffer satisfies the time buffer threshold (e.g., such that a≥K).

In this way, UE1 may transmit sidelink HARQ feedback to one or more of UE2 through UEm based at least in part on a time buffer threshold specifically configured for UE1. This permits UE1 to identify and/or select a time buffer threshold that is compatible with UE1's capability for generating and transmitting sidelink HARQ feedback, permits UE1 to identify and/or select a time buffer threshold that increases the efficiency of sidelink HARQ feedback reporting of UE1, and/or the like.

As indicated above, FIG. 6 is provided as one or more examples. Other examples may differ from what is described with respect to FIG. 6. For example, UE2 through UEm may each configure a particular time buffer threshold for providing sidelink HARQ feedback to other UEs in UE1 through UEm using one or more techniques described above in connection with FIGS. 5A, 5B, and/or 6.

Figure 7:
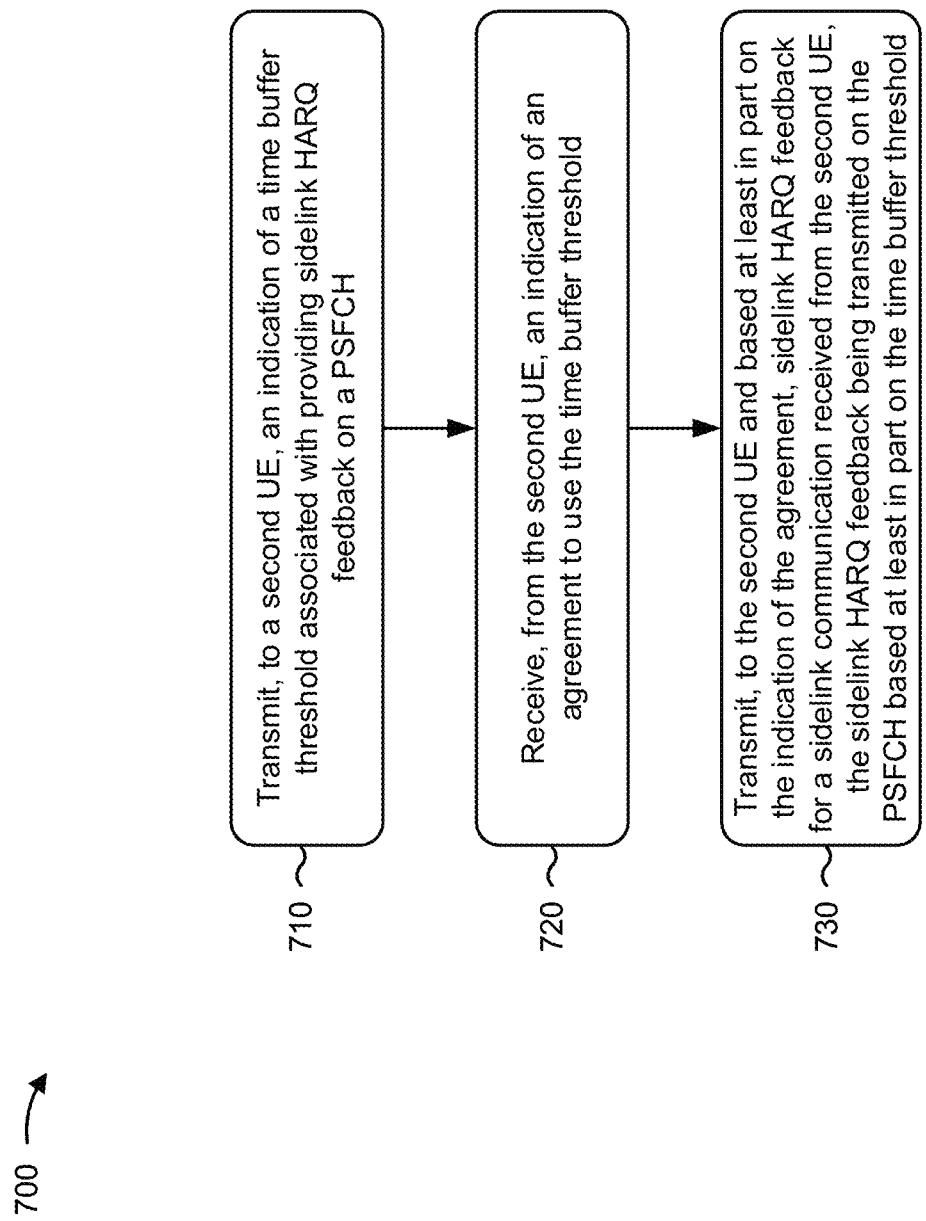
FIGS. 7-9 are diagrams illustrating example processes performed, for example, by a UE, in accordance with various aspects of the present disclosure.

FIG. 7 is a diagram illustrating an example process 700 performed, for example, by a first UE, in accordance with various aspects of the present disclosure. Example process 700 is an example where the first UE (e.g., UE 120) performs operations associated with a configurable transmission timeline for PSSFCH.

As shown in FIG. 7, in some aspects, process 700 may include transmitting, to a second UE, an indication of a time buffer threshold associated with providing sidelink HARQ feedback on a PSFCH (block 710). For example, the first UE (e.g., using antenna 252, MOD 254, transmit processor 264, Tx MIMO processor 266, controller/processor 280, memory 282, and/or the like) may transmit, to a second UE, an indication of a time buffer threshold associated with providing sidelink HARQ feedback on a PSFCH, as described above.

As further shown in FIG. 7, in some aspects, process 700 may include receiving, from the second UE, an indication of an agreement to use the time buffer threshold (block 720). For example, the first UE (e.g., using antenna 252, DEMOD 254, MIMO detector 256, receive processor 258, controller/processor 280, memory 282, and/or the like) may receive, from the second UE, an indication of an agreement to use the time buffer threshold, as described above.

As further shown in FIG. 7, in some aspects, process 700 may include transmitting, to the second UE and based at least in part on the indication of the agreement, sidelink HARQ feedback for a sidelink communication received from the second UE, the sidelink HARQ feedback being transmitted on the PSFCH based at least in part on the time buffer threshold (block 730). For example, the first UE (e.g., using antenna 252, MOD 254, transmit processor 264, Tx MIMO processor 266, controller/processor 280, memory 282, and/or the like) may transmit, to the second UE and based at least in part on the indication of the agreement, sidelink HARQ feedback for a sidelink communication received from the second UE, the sidelink HARQ feedback being transmitted on the PSFCH based at least in part on the time buffer threshold, as described above.

Process 700 may include additional aspects, such as any single aspect or any combination of aspects described below and/or in connection with one or more other processes described elsewhere herein.

With respect to process 700, and in a first aspect, transmitting the sidelink HARQ feedback comprises transmitting the sidelink HARQ feedback at a time buffer after receiving the sidelink communication, the time buffer satisfying the time buffer threshold. With respect to process 700, and in a second aspect, alone or in combination with the first aspect, the time buffer threshold is based at least in part on a user equipment capability of the first user equipment to generate and transmit the sidelink HARQ feedback.

With respect to process 700, and in a third aspect, alone or in combination with one or more of the first and second aspects, process 700 includes identifying the time buffer threshold from a plurality of candidate time buffer thresholds. With respect to process 700, and in a fourth aspect, alone or in combination with one or more of the first through third aspects, the sidelink communication is a unicast sidelink communication. With respect to process 700, and in a fifth aspect, alone or in combination with one or more of the first through fourth aspects, transmitting the indication of the time buffer threshold comprises transmitting the indication of the time buffer threshold during connection establishment between the first UE and the second UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
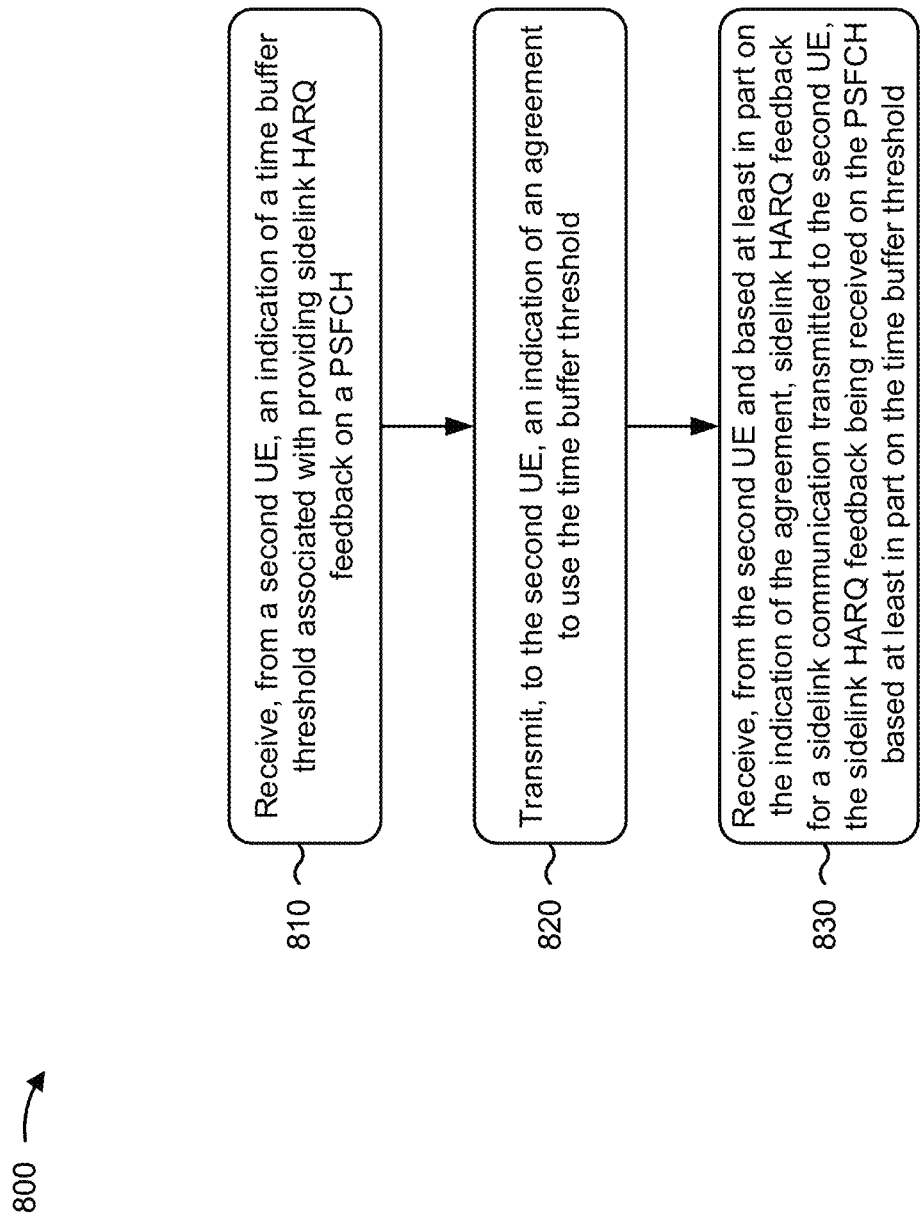

FIG. 8 is a diagram illustrating an example process 800 performed, for example, by a first UE, in accordance with various aspects of the present disclosure. Example process 800 is an example where the first UE (e.g., UE 120) performs operations associated with a configurable transmission timeline for PSFCH.

As shown in FIG. 8, in some aspects, process 800 may include receiving, from a second UE, an indication of a time buffer threshold associated with providing sidelink HARQ feedback on a PSFCH (block 810). For example, the first UE (e.g., using antenna 252, DEMOD 254, MIMO detector 256, receive processor 258, controller/processor 280, memory 282, and/or the like) may receive, from a second UE, an indication of a time buffer threshold associated with providing sidelink HARQ feedback on a PSFCH, as described above.

As further shown in FIG. 8, in some aspects, process 800 may include transmitting, to the second UE, an indication of an agreement to use the time buffer threshold (block 820). For example, the first UE (e.g., using antenna 252, MOD 254, transmit processor 264, Tx MIMO processor 266, controller/processor 280, memory 282, and/or the like) may transmit, to the second UE, an indication of an agreement to use the time buffer threshold, as described above.

As further shown in FIG. 8, in some aspects, process 800 may include receiving, from the second UE and based at least in part on the indication of the agreement, sidelink HARQ feedback for a sidelink communication transmitted to the second UE, the sidelink HARQ feedback being received on the PSFCH based at least in part on the time buffer threshold (block 830). For example, the first UE (e.g., using antenna 252, DEMOD 254, MIMO detector 256, receive processor 258, controller/processor 280, memory 282, and/or the like) may receive, from the second UE and based at least in part on the indication of the agreement, sidelink HARQ feedback for a sidelink communication transmitted to the second UE, the sidelink HARQ feedback being received on the PSFCH based at least in part on the time buffer threshold, as described above.

Process 800 may include additional aspects, such as any single aspect or any combination of aspects described below and/or in connection with one or more other processes described elsewhere herein.

With respect to process 800, and in a first aspect, receiving the sidelink HARQ feedback comprises receiving the sidelink HARQ feedback at a time buffer after receiving the sidelink communication, the time buffer satisfying the time buffer threshold. With respect to process 800, and in a second aspect, alone or in combination with the first aspect, the time buffer threshold is based at least in part on a user equipment capability of the first user equipment to generate and transmit the sidelink hybrid automatic repeat request feedback. With respect to process 800, and in a third aspect, alone or in combination with one or more of the first and second aspects, the time buffer threshold is included in a plurality of candidate time buffer thresholds.

With respect to process 800, and in a fourth aspect, alone or in combination with one or more of the first through third aspects, the sidelink communication is a unicast sidelink communication. With respect to process 800, and in a fifth aspect, alone or in combination with one or more of the first through fourth aspects, receiving the indication of the time buffer threshold comprises receiving the indication of the time buffer threshold during connection establishment between the first UE and the second UE.

With respect to process 800, and in a sixth aspect, alone or in combination with one or more of the first through fifth aspects, process 800 includes detecting a collision between the sidelink HARQ feedback received from the second UE and sidelink HARQ feedback received from a third UE, and identifying the sidelink HARQ feedback received from the second UE from the sidelink HARQ feedback received from a third UE based at least in part on a PSFCH sequence associated with the second UE, the PSFCH sequence being based at least in part on a source identifier associated with the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
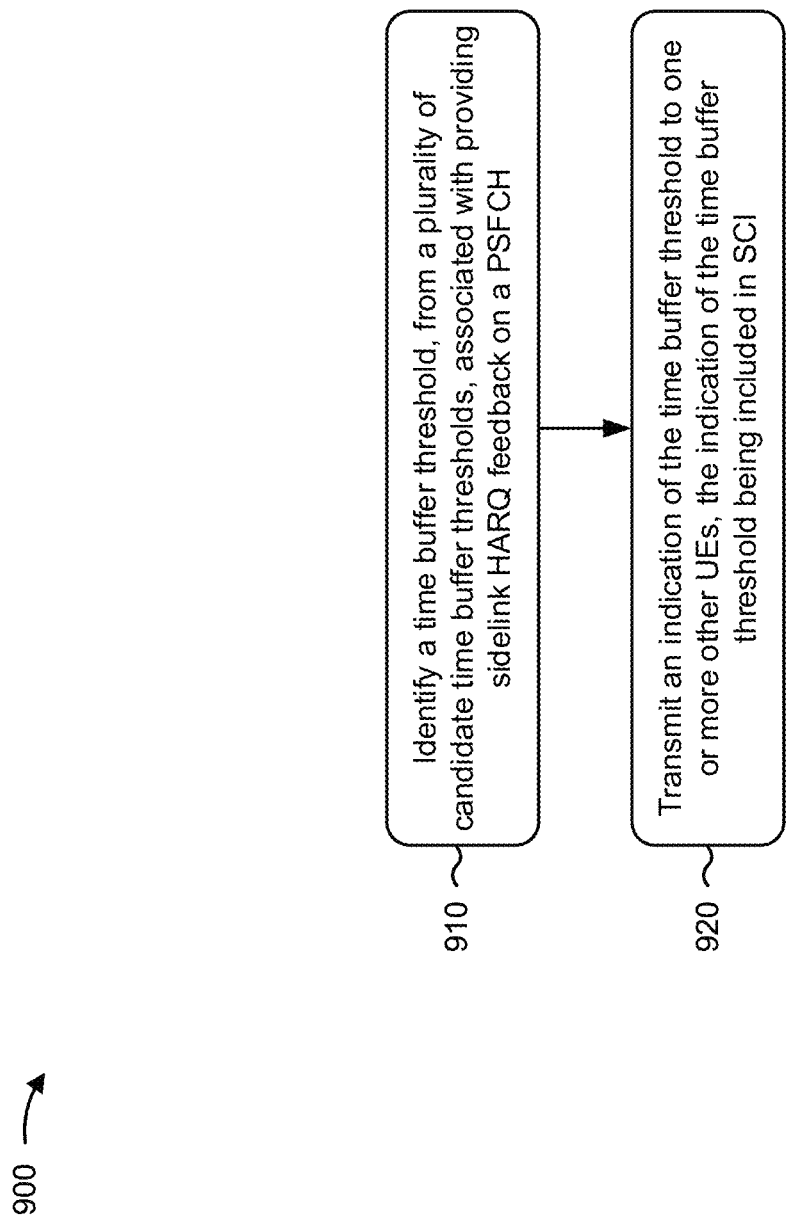

FIG. 9 is a diagram illustrating an example process 900 performed, for example, by a first UE, in accordance with various aspects of the present disclosure. Example process 900 is an example where the first UE (e.g., UE 120) performs operations associated with a configurable transmission timeline for PSFCH.

As shown in FIG. 9, in some aspects, process 900 may include identifying a time buffer threshold, from a plurality of candidate time buffer thresholds, associated with providing sidelink HARQ feedback on a PSFCH (block 910). For example, the first UE (e.g., using receive processor 258, transmit processor 264, controller/processor 280, memory 282, and/or the like) may identify a time buffer threshold, from a plurality of candidate time buffer thresholds, associated with providing sidelink HARQ feedback on a PSFCH, as described above.

As further shown in FIG. 9, in some aspects, process 900 may include transmitting an indication of the time buffer threshold to one or more other UEs, the indication of the time buffer threshold being included in SCI (block 920). For example, the first UE (e.g., using antenna 252, MOD 254, transmit processor 264, Tx MIMO processor 266, controller/processor 280, memory 282, and/or the like) may transmit an indication of the time buffer threshold to one or more other UEs, the indication of the time buffer threshold being included in SCI, as described above.

Process 900 may include additional aspects, such as any single aspect or any combination of aspects described below and/or in connection with one or more other processes described elsewhere herein.

With respect to process 900, and in a first aspect, the time buffer threshold is based at least in part on a UE capability of the first UE to generate and transmit sidelink hybrid automatic repeat request feedback. With respect to process 900, and in a second aspect, alone or in combination with the first aspect, process 900 includes receiving, from a second UE of the one or more other UEs, a groupcast sidelink communication and transmitting, to the second UE, sidelink HARQ feedback for the groupcast sidelink communication, the sidelink hybrid automatic repeat request feedback being transmitted on the PSFCH based at least in part on the time buffer threshold.

With respect to process 900, and in a third aspect, alone or in combination with one or more of the first and second aspects, transmitting the sidelink HARQ feedback comprises transmitting the sidelink HARQ feedback at a time buffer after receiving the groupcast sidelink communication, the time buffer satisfying the time buffer threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment, comprising:
   transmitting, to a second user equipment and in sidelink control information, an indication of a first time buffer threshold, of a plurality of candidate time buffer thresholds configured by a network node for selection by the first UE, associated with providing first sidelink hybrid automatic repeat request feedback on a physical sidelink feedback channel,
      the first time buffer threshold being based at least in part on a user equipment capability of the first user equipment;
   receiving, from the second user equipment and in the sidelink control information, one or more indications of:
      a rejection to use the first time buffer threshold, and
      a second time buffer threshold, of the plurality of candidate time buffer thresholds, associated with providing the first sidelink hybrid automatic repeat request feedback;
   transmitting, to the second user equipment, an indication of an agreement to use the second time buffer threshold;
   transmitting, to the second user equipment, using a first physical sidelink feedback control channel (PSFCH) sequence associated with the first user equipment, and based at least in part on the indication of the agreement, the first sidelink hybrid automatic repeat request feedback for a sidelink communication received from the second user equipment,
      the first sidelink hybrid automatic repeat request feedback being transmitted on the physical sidelink feedback channel based at least in part on the second time buffer threshold, and
   receiving, from the second user equipment, second sidelink hybrid automatic repeat request feedback, using a second PSFCH sequence associated with the second user equipment, based at least in part on:
      transmitting the first sidelink hybrid automatic repeat request feedback, and
      a collision between the first sidelink hybrid automatic repeat request feedback, transmitted by the first user equipment and third sidelink hybrid automatic repeat request feedback, received from a third user equipment.

2. The method of claim 1, wherein the first sidelink hybrid automatic repeat request feedback is transmitted at a time buffer, satisfying the second time buffer threshold, after receiving the sidelink communication.

3. The method of claim 1, wherein the user equipment capability is associated with the first user equipment generating and transmitting the first sidelink hybrid automatic repeat request feedback.

4. The method of claim 1, wherein the sidelink communication is a unicast sidelink communication.

5. The method of claim 1, wherein transmitting the indication of the first time buffer threshold comprises:
   transmitting the indication of the first time buffer threshold during a connection establishment between the first user equipment and the second user equipment.

6. The method of claim 1, further comprising:
   selecting at least one of the first time buffer threshold or the second time buffer threshold based at least in part on one or more channel conditions of the physical sidelink feedback channel.

7. A method of wireless communication performed by a first user equipment, comprising:
   receiving, from a second user equipment and in sidelink control information, an indication of a first time buffer threshold, different from one or more candidate time buffer thresholds configured by a network node for selection by the first UE, associated with providing first sidelink hybrid automatic repeat request feedback on a physical sidelink feedback channel, the first time buffer threshold being based at least in part on a user equipment capability of the first user equipment;
   transmitting, to the second user equipment and in the sidelink control information, one or more indications of:
      a rejection to use the first time buffer threshold, and
      a second time buffer threshold, of the one or more time buffer thresholds, associated with providing the first sidelink hybrid automatic repeat request feedback;
   receiving, from the second user equipment, an indication of an agreement to use the second time buffer threshold;
   transmitting, to the second user equipment, using a first physical sidelink feedback control channel (PSFCH) sequence associated with the first user equipment, and based at least in part on the indication of the agreement, the first sidelink hybrid automatic repeat request feedback,
      the first sidelink hybrid automatic repeat request feedback being transmitted on the physical sidelink feedback channel based at least in part on the second time buffer threshold; and
   receiving, from the second user equipment and based at least in part on transmitting the first sidelink hybrid automatic repeat request feedback, the first sidelink hybrid automatic repeat request feedback for a sidelink communication transmitted to the second user equipment; and
   transmitting, to the second user equipment, second sidelink hybrid automatic repeat request feedback, using a second PSFCH sequence associated with the second user equipment, based at least in part on:
      receiving the first sidelink hybrid automatic repeat request feedback, and a collision between the first sidelink hybrid automatic repeat request feedback, received by the first user equipment and third sidelink hybrid automatic repeat request feedback, received from with a third user equipment.

8. The method of claim 7, wherein the first sidelink hybrid automatic repeat request feedback is received at a time buffer, satisfying the second time buffer threshold, after receiving the sidelink communication.

9. The method of claim 7, wherein the user equipment capability is associated with the first user equipment generating and transmitting the first sidelink hybrid automatic repeat request feedback.

10. The method of claim 7, wherein the sidelink communication is a unicast sidelink communication.

11. The method of claim 7, wherein the indication of the first time buffer threshold is received during a connection establishment between the first user equipment and the second user equipment.

12. The method of claim 7, further comprising:
detecting, based at least in part on the first PSFCH sequence, the collision between the first sidelink hybrid automatic repeat request feedback, received from the second user equipment, and the third sidelink hybrid automatic repeat request feedback, received from the third user equipment.

13. The method of claim 12, further comprising:
identifying the first sidelink hybrid automatic repeat request feedback, received from the second user equipment, from the third sidelink hybrid automatic repeat request feedback, received from the third user equipment, based at least in part on the second PSFCH sequence associated with the second user equipment.

14. The method of claim 7, further comprising:
selecting the second time buffer threshold based at least in part on one or more channel conditions of the physical sidelink feedback channel.

15. A method of wireless communication performed by a first user equipment, comprising:
identifying a first time buffer threshold, a plurality of candidate time buffer thresholds configured by a network node for selection by the first UE, associated with providing first sidelink hybrid automatic repeat request feedback on a physical sidelink feedback channel,
the first time buffer threshold being based at least in part on a user equipment capability of the first user equipment;
transmitting an indication of the first time buffer threshold to one or more other user equipment,
the indication of the first time buffer threshold being included in sidelink control information;
receiving, from the one or more other user equipment and sidelink control information, one or more indications of:
a rejection of the first time buffer threshold, and
a second time buffer threshold, of the plurality of candidate time buffer thresholds, associated with providing the first sidelink hybrid automatic repeat request feedback;
transmitting, to the one or more other user equipment, using a first physical sidelink feedback control channel (PSFCH) sequence associated with the first user equipment, and based at least in part on the indication of the second time buffer threshold, the first sidelink hybrid automatic repeat request feedback for a sidelink communication received from the one or more other user equipment; and receiving, from the second user equipment, second sidelink hybrid automatic repeat request feedback, using a second PSFCH sequence associated with the second user equipment, based at least in part on:
transmitting the first sidelink hybrid automatic repeat request feedback, and
a collision between the first sidelink hybrid automatic repeat request feedback, transmitted by the first user equipment and third sidelink hybrid automatic repeat request feedback, received from a third user equipment.

16. The method of claim 15, wherein the user equipment capability is associated with the first user equipment generating and transmitting the first sidelink hybrid automatic repeat request feedback.

17. The method of claim 15, further comprising:
receiving, from a second user equipment of the one or more other user equipment, a groupcast sidelink communication.

18. The method of claim 17, wherein the first sidelink hybrid automatic repeat request feedback for the groupcast sidelink communication is transmitted to the second user equipment.

19. The method of claim 18, wherein the first sidelink hybrid automatic repeat request feedback is transmitted at a time buffer, satisfying the second time buffer threshold, after receiving the groupcast sidelink communication.

20. The method of claim 15, further comprising:
selecting at least one of the first time buffer threshold or the second time buffer threshold based at least in part on one or more channel conditions of the physical sidelink feedback channel.

21. A first user equipment for wireless communication, comprising:
one or more memories; and
one or more processors coupled to the one or more memories, the one or more processors configured to:
transmit, to a second user equipment and in sidelink control information, an indication of a first time buffer threshold, of a plurality of time buffer thresholds configured by a network node for selection by the first UE, associated with providing first sidelink hybrid automatic repeat request feedback on a physical sidelink feedback channel,
the first time buffer threshold being based at least in part on a user equipment capability of the first user equipment;
receive, from the second user equipment and the sidelink control information, one or more indications of:
a rejection to use the first time buffer threshold, and
a second time buffer threshold, of the plurality of time buffer thresholds, associated with providing the first sidelink hybrid automatic repeat request feedback;
transmit, to the second user equipment, an indication of an agreement to use the second time buffer threshold; and
transmit, to the second user equipment, using a first physical sidelink feedback control channel (PSFCH) sequence associated with the first user equipment, and based at least in part on the indication of the agreement, the first sidelink hybrid automatic repeat request feedback for a sidelink communication received from the second user equipment,
the first sidelink hybrid automatic repeat request feedback being transmitted on the physical sidelink feedback channel based at least in part on the second time buffer threshold; and receive, from the second user equipment, second sidelink hybrid automatic repeat request feedback, using a second PSFCH sequence associated with the second user equipment, based at least in part on:
transmitting the first sidelink hybrid automatic repeat request feedback, and
a collision between the first sidelink hybrid automatic repeat request feedback, transmitted by the first user equipment and third sidelink hybrid automatic repeat request feedback, received from a third user equipment.

22. The first user equipment of claim 21, wherein the first sidelink hybrid automatic repeat request feedback is transmitted at a time buffer, satisfying the second time buffer threshold, after receiving the sidelink communication.

23. The first user equipment of claim 21, wherein the user equipment capability of the first user equipment is associated with the first user equipment generating and transmitting the first sidelink hybrid automatic repeat request feedback.

24. The first user equipment of claim 21, wherein the sidelink communication is a unicast sidelink communication.

25. The first user equipment of claim 21, wherein the indication of the first time buffer threshold is transmitted during a connection establishment between the first user equipment and the second user equipment.

\* \* \* \* \*